Patented Mar. 31, 1942

2,278,384

UNITED STATES PATENT OFFICE 2,278,384

PURIFICATION OF CARBON DISULPHIDE

Johann Joseph Stoeckly, Teltow, and Elmar Profft, Berlin-Lichterfelde, Germany, assignors to North American Rayon Corporation, New York, N. Y., a corporation of Delaware No Drawing. Application May 9, 1939, Serial No. 272,635. In Germany May 12, 1938

4 Claims. (Cl. 23—206)

This invention relates to improvements in methods for purifying carbon disulphide and more particularly the carbon disulphide which is recovered during viscose manufacturing operations.

Carbon disulphide, particularly after it has been used in viscose manufacturing operations is contaminated with numerous impurities, particularly sulphur compounds such as thio-formaldehydes and others which impart a bad odor to the carbon disulphide and otherwise render it unfit for reuse.

It has already been proposed to treat such contaminated carbon disulphide with a strong solution of caustic alkali, e. g. caustic soda and then to filter the carbon disulphide through dry aluminum oxide or alumina.

We have found by experiment, however, that in purifying carbon disulphide so contaminated, it is not necessary to use strong solutions of caustic alkalis but that the method can be practised with very dilute caustic liquor or weakly alkalinized water having an NaOH content of 1% or less. This for one thing tends to attack the carbon disulphide per se to a lesser content. Under these conditions, during the settling of the wash mixture, the purifying agent, which is lighter, remains at the top and the heavier carbon disulphide collects at the bottom of the reacting vessel. Such procedure is preferable also for various reasons and particularly because of the greater safety provided. Due to the great difference in specific gravities, stratification and separation are also more rapidly effected.

We have also found that in lieu of alumina, other and to a certain extent much cheaper adsorbent agents may be used for practising the succeeding filtering operation. Adsorbent materials of the kind that are adapted to be used for this purpose are metal hydroxides such as calcium hydroxide, magnesium hydroxide, iron hydroxide, as are also metal oxides such as iron oxide.

We have found that in these purification processes and especially in removing the residual, especially bad smelling carbon disulphide reduction products such as thio-formaldehydes, the reaction does not merely involve a mere surface action of the pulverulent, pigment-like materials or adsorbent agents used nor is the granular fineness thereof the sole criterion since we have found, for example, that finely pulverulent barium sulphate, obtained by precipitation and of a grain fineness of about one micron exerts no perceptible purifying action. Likewise, the action does not seem to be exclusively dependent on any specific action of any particular metal in the compounds used since it has been found that while the carbonates of calcium and magnesium exert a slight action, the corresponding hydroxides behave very actively in this respect.

Example 100 kg. of crude, bad smelling carbon disulphide, recovered by condensation or other means from viscose manufacturing processes are intimately stirred with 200 liters of a .25% solution of caustic soda until an emulsion-like liquid is produced. The mixture is thereupon allowed to stand until complete separation has taken place. The carbon disulphide is then drawn off from the bottom of the mixing vessel. The thus preliminarily purified carbon disulphide is then passed through a layer of filtering material consisting of 5 kg. of dry, finely pulverulent calcium hydroxide. The thus treated carbon disulphide, freed of its bad smell, may be used directly for most purposes in the arts, and even in viscose manufacturing processes. Dry, finely granular magnesium hydroxide powder may be employed in practically the same quantity proportions.

What we claim is:

1. Method for purifying and deodorizing impure carbon disulphide which consists of intimately stirring carbon disulphide recovered from viscose manufacturing processes and containing thioformaldehydes with a solution containing up to about 1% by weight of caustic alkali to form an emulsion-like liquid, allowing said liquid to stand until the carbon disulphide has completely separated from said caustic solution, withdrawing said carbon disulphide from said caustic solution and then passing said carbon disulphide through a layer of a finely pulverulent, dry, oxygen containing compound selected from the group consisting of calcium hydroxide, magnesium hydroxide, iron hydroxide and iron oxide to form a purified and deodorized carbon disulphide.

2. Method for purifying and deodorizing impure carbon disulphide which consists of intimately stirring carbon disulphide recovered from viscose manufacturing processes and containing thioformaldehydes with a solution containing up to about 1% by weight of caustic alkali to form an emulsion-like liquid, allowing said liquid to stand until the carbon disulphide has completely separated from said caustic solution, withdrawing said carbon disulphide from said caustic solution, and then passing said carbon disulphide through a layer of a finely pulverulent, dry calcium hydroxide to form a purified and deodorized carbon disulphide.

3. Method for purifying and deodorizing impure carbon disulphide which consists of intimately stirring carbon disulphide recovered from viscose manufacturing processes and containing thioformaldehydes with a solution containing up to about 1% by weight of caustic alkali to form an emulsion-like liquid, allowing said liquid to stand until the carbon disulphide has completely separated from said caustic solution, withdrawing said carbon disulphide from said caustic solution and then passing said carbon disulphide through a layer of a finely pulverulent, dry magnesium hydroxide to form a purified and deodorized carbon disulphide.

4. Method of purifying and deodorizing impure carbon disulphide which consists of intimately stirring carbon disulphide recovered from viscose manufacturing processes and containing thioformaldehydes with a solution containing up to about 1% by weight of caustic alkali to form an emulsion-like liquid, allowing said liquid to stand until the carbon disulphide has completely separated from said caustic solution, withdrawing said carbon disulphide from said caustic solution and then passing said carbon disulphide through a layer of a finely pulverulent, dry iron hydroxide to form a purified and deodorized carbon disulphide.

JOHANN JOSEPH STOECKLY.
ELMAR PROFFT.